United States Patent
Jung et al.

(10) Patent No.: US 11,578,226 B2
(45) Date of Patent: Feb. 14, 2023

(54) INKJET PRINTING OF WOOD COLOURS

(71) Applicant: AGFA NV, Mortsel (BE)

(72) Inventors: Jürgen Jung, Mortsel (BE); Rita Torfs, Mortsel (BE); Marc Bernard Graindourze, Mortsel (BE); Rene Geelen, Mortsel (BE)

(73) Assignee: AGFA NV, Mortsel (BE)

( * ) Notice: Subject to any disclaimer, the term of this patent is extended or adjusted under 35 U.S.C. 154(b) by 2379 days.

(21) Appl. No.: 14/370,977

(22) PCT Filed: Jan. 16, 2013

(86) PCT No.: PCT/EP2013/050715
§ 371 (c)(1),
(2) Date: Jul. 8, 2014

(87) PCT Pub. No.: WO2013/113553
PCT Pub. Date: Aug. 8, 2013

(65) Prior Publication Data
US 2014/0349087 A1    Nov. 27, 2014

Related U.S. Application Data

(60) Provisional application No. 61/597,846, filed on Feb. 13, 2012.

(30) Foreign Application Priority Data

Feb. 3, 2012    (EP) .................. 12153872

(51) Int. Cl.
| | | |
|---|---|---|
| *C09D 11/40* | (2014.01) | |
| *B05D 1/02* | (2006.01) | |
| *C09D 11/322* | (2014.01) | |
| *C09D 11/101* | (2014.01) | |

(52) U.S. Cl.
CPC .............. *C09D 11/40* (2013.01); *B05D 1/02* (2013.01); *C09D 11/101* (2013.01); *C09D 11/322* (2013.01); *Y10T 428/24802* (2015.01)

(58) Field of Classification Search
CPC ...... B05D 1/02; C09D 11/101; C09D 11/322; C09D 11/40; Y10T 428/24802
See application file for complete search history.

(56) References Cited

U.S. PATENT DOCUMENTS

| | | | |
|---|---|---|---|
| 2003/0098986 A1* | 5/2003 | Pop ..................... | H04N 1/54 358/1.9 |
| 2003/0106461 A1 | 6/2003 | Sano | |
| 2007/0266887 A1* | 11/2007 | Koganehira ......... | C09D 11/322 106/31.6 |
| 2009/0033729 A1 | 2/2009 | Bauer et al. | |
| 2010/0047455 A1* | 2/2010 | Hoogmartens ...... | C09D 11/322 427/258 |
| 2010/0116010 A1 | 5/2010 | Fechner et al. | |
| 2010/0302300 A1* | 12/2010 | Verdonck ............... | B41J 2/2114 347/17 |

FOREIGN PATENT DOCUMENTS

| | | |
|---|---|---|
| EP | 1 239 011 A1 | 9/2002 |
| EP | 1 857 511 A1 | 11/2007 |
| EP | 2 173 826 A2 | 4/2010 |

OTHER PUBLICATIONS

Official Communication issued in International Patent Application No. PCT/EP2013/050715, dated Apr. 17, 2013.

Lambert et al., "Symbolic Fusion of Luminance-hue-chroma Features for Region Segmentation," Pattern Recognition, vol. 32, No. 11, Nov. 1, 1999, pp. 1857-1872.

Nayatani, "Revision of the Chroma and Hue Scales of a Nonlinear Color-Appearance Model," Color Research & Application, vol. 20, No. 3, Jun. 1, 1995, pp. 143-155.

* cited by examiner

*Primary Examiner* — Christopher M Polley
*Assistant Examiner* — Sathavaram I Reddy
(74) *Attorney, Agent, or Firm* — Leydig, Voit & Mayer, Ltd.

(57) ABSTRACT

An inkjet ink set consisting of a black inkjet ink, a cyan inkjet ink and two inkjet inks A and B, optionally complemented by a white ink and/or a colourless ink, wherein the inkjet ink A has a hue angle H* between 70 and 85 and a chroma C* between 30 and 80; the inkjet ink B has a hue angle H* between 20 and 40 and a chroma C* between 30 and 80; and the CIE L* a* b* coordinates were determined on polyethylene coated white paper for a 2° observer under a D50 light source.

14 Claims, No Drawings

INKJET PRINTING OF WOOD COLOURS

CROSS-REFERENCE TO RELATED APPLICATIONS

This application is a 371 National Stage Application of PCT/EP2013/050715, filed Jan. 16, 2013. This application claims the benefit of U.S. Provisional Application No. 61/597,846, filed Feb. 13, 2012, which is incorporated by reference herein in its entirety. In addition, this application claims the benefit of European Application No. 12153872.2, filed Feb. 3, 2012, which is also incorporated by reference herein in its entirety.

BACKGROUND OF THE INVENTION

1. Field of the Invention

The present invention relates to industrial inkjet ink printing processes used for reproducing wood colours and patterns on various substrates and objects.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

An increasing interest has been observed for using inkjet ink printing in the manufacture of flooring, kitchen, furniture and wall panels, due to its flexibility which makes short production runs and personalized products possible. However, it has also been found that it is not straightforward to obtain a true reproduction of wood colours, such as oak and cherry.

In addition, the manufacturers who combine various parts of different materials or materials from different sources into one product are also faced with the problem of metamerism. This phenomenon occurs when two materials match in colour under some lighting conditions but not under other lighting conditions. A customer expects all parts of e.g. a kitchen cabinet that are the same colour to match whether viewed in daylight, under halogen lighting or under Neon lighting.

In the CIELAB colour space, a colour is defined using three terms L*, a*, and b*. L* defines the lightness of a colour, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as hue angle H* and chroma C* are used to further describe a given colour, wherein:

$$H^* = \tan^{-1}(b^*/a^*) \qquad \text{equation 1}$$

$$C^* = (a^{*2} + b^{*2})^{1/2} \qquad \text{equation 2}$$

In the CIELAB colour space, ΔE* defines the "colour-distance", i.e. the difference between two colours, such as the colour of the original printed image and the colour of the same image after light fading. The higher the ΔE* number, the more difference between the two colours:

$$\Delta E^* = (\Delta L^{*2} + \Delta a^{*2} + \Delta b^{*2})^{1/2} \qquad \text{equation 3}$$

The CIE 1994 Colour Difference Model provided an improved calculation of the colour difference by including some weighing factors. The colour difference measured under the new model is indicated by ΔE94.

$$\Delta E^*_{94} = \sqrt{\left(\frac{\Delta L^*}{K_L}\right)^2 + \left(\frac{\Delta C^*}{1+K_1 C_1^*}\right)^2 + \left(\frac{\Delta H^*}{1+K_2 C_1^*}\right)^2} \qquad \text{equation 4}$$

wherein:

$$\Delta L^* = L_1^* - L_2^*, \quad C_1^* = \sqrt{a_1^{*2} + b_1^{*2}}, \quad C_2^* = \sqrt{a_2^{*2} + b_2^{*2}},$$

$$\Delta C^* = C_1^* - C_2^*, \quad \Delta a^* = a_1^* - a_2^*, \quad \Delta b^* = b_1^* - b_2^* \text{ and}$$

$$\Delta H^* = \sqrt{\Delta E^{*2} - \Delta L^{*2} - \Delta C^{*2}} = \sqrt{\Delta a^{*2} + \Delta b^{*2} - \Delta C^{*2}},$$

and where the weighting factors depend on the application. For graphic arts applications: $K_L=1$, $K_1=0.045$ and $K_2=0.014$.

The use of a "standard" ink set of CMYK inks is insufficient to solve problems of true wood colour reproduction and metamerism. The approach generally taken is to increase the colour gamut by expanding the ink set with other colour inks, such as a red ink, an orange ink and a violet ink. For example, EP 2173826 A (HP) discloses an ink set including a red ink and a magenta ink exhibiting an enhanced colour gamut volume and a reduced metamerism. Improvement can also be made by including so-called light and dark inks. US 2009033729 (HP) discloses an ink set including a light magenta ink and a dark magenta ink to enhance the colour gamut and reduce metamerism.

EP 1857511 A (AGFA) discloses a non-aqueous inkjet ink set including a non-aqueous inkjet ink comprising a diketopyrrolo-pyrrole pigment and at least one polyalkyleneglycol dialkylether having a molecular weight of at least 250. Although the inkset is used for manufacturing decorative wood laminates, the application is silent on metamerism.

US2010/116010 A1 (CLARIANT) discloses aqueous pigment preparations containing (A) at least one organic and/or inorganic pigment, (B) a dispersant of formula (I) or (II), or mixtures of the dispersants of formulas (I) and (II), (C) optionally wetting agents, (D) optionally other surfactants and/or dispersants, (E) optionally one or more organic solvents or one or more hydrotropic substances, (F) optionally other additives used conventionally for the production of aqueous pigment dispersions and (G) water. However, the application is again silent on metamerism.

US 2003106461 (SEIKO EPSON) discloses the combination of a yellow ink, a magenta ink and a cyan ink with an additional inkjet ink composition including a mixture of a yellow pigment, a magenta pigment and a cyan pigment, in order to reduce metamerism.

EP 1239011 A (SEIKO EPSON) discloses an ink set for reducing metamerism including a yellow ink containing C.I. Pigment Yellow 110; a magenta ink containing C.I. Pigment red 122 and/or C.I. Pigment Red 202; and a cyan ink containing C.I. Pigment Blue 15:3 and/or C.I. Pigment Blue 15:4.

However, the addition of extra inks to an ink set not only represents an economical penalization for the customer who, for example, has to foresee in a larger storage room for the different inks, but also renders the inkjet printer and the image processing software more complex.

It is desirable to have an inkjet printing process not requiring a complex inkjet printer and image processing software to use an extended set of inkjet inks for a true reproduction of wood colours having minimal metamerism.

SUMMARY OF INVENTION

In order to overcome the problems described above, preferred embodiments of the present invention have been realised with an inkjet ink set as defined below.

Preferred embodiments of the invention have also been realised with a method of inkjet printing as defined below.

It was surprisingly found that an inkjet ink set consisting of only a black inkjet ink, a cyan inkjet ink and two specific inkjet inks, i.e. a warm yellow ink (A) and a red ink (B) with limited chroma C*, was capable of strongly reducing metamerism while still keeping the colour gamut sufficiently large for obtaining a true reproduction of all wood colours used in decoration applications.

Further advantages and benefits of the invention will become apparent from the description hereinafter.

DETAILED DESCRIPTION OF THE PREFERRED EMBODIMENTS

Definitions

The term "radiation curable (inkjet) ink" means that the (inkjet) ink is curable by UV radiation or by e-beam.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

Inkjet Ink Sets

The inkjet ink set according to a preferred embodiment of the present invention consists of a black inkjet ink, a cyan inkjet ink and two inkjet inks (A) and (B), optionally complemented by a white ink and/or a colourless ink, wherein the inkjet ink (A) has a hue angle H* between 70 and 85 and a chroma C* between 30 and 80; the inkjet ink (B) has a hue angle H* between 20 and 40 and a chroma C* between 30 and 80; and the CIE L* a* b* coordinates were determined on polyethylene coated white paper for a 2° observer under a D50 light source.

In a preferred embodiment of the inkjet ink set, at least one of the two inkjet inks (A) and (B) includes a mixture of at least two pigments.

In a more preferred embodiment of the inkjet ink set, the two inkjet inks (A) and (B) include a mixture of at least two pigments. In fact, it has been observed that if an orange pigment, more preferably the same orange pigment, most preferably the same pigment C.I. Pigment Orange 71, was used in both inkjet inks (A) and (B) that outstanding results were obtained for true reproduction of wood colours and minimal metamerism.

The inks of the inkjet ink set may be solvent based inks, but are preferably aqueous or water based inks, and most preferably radiation curable inks. Depending on the production process of decorative panels employing the inkjet ink set of the present invention, solvent based inks tend to have undesired effects like dissolving or extracting certain components from an engineered wood product, such as MDF or HDF, or weakening the firmness thereof. These problems are largely resolved by using aqueous or water based inks. The advantage of radiation curable inks is that, unlike aqueous or water based inks for obtaining a high image quality that they do not require to be printed on a paper to produce a so-called decorative paper. The decorative paper is then usually impregnated with a resin, e.g. a melamine based resin, and integrated into a decorative panel. The radiation curable inks include polymerizable compounds and no or only minor amounts of water and/or organic solvents allowing them to be printed on substantially non-absorbing surfaces. The radiation process for curing the polymerizable compounds is usually much faster and requires less energy than the evaporation process of the inks based on water and/or organic solvents. Another advantage of the use of radiation curable inks is that they can be designed in such a way that the cured ink layer becomes compatible with a support layer for supporting the decorative layer and/or an abrasive overlay for protecting the decorative layer.

In a preferred embodiment of the ink set according to the present invention the inks are radiation curable inks, more preferably the inks are UV-curable inks.

The inkjet ink set according to a preferred embodiment of the present invention may include one or more white inks and/or colourless inks, more preferably a white inkjet ink and/or a colourless inkjet ink.

A white ink may be used for providing a white background for the colour inkjet inks of the ink set. A white background has the advantage that defects and irregularities or the colour of the ink receiver surface are hidden without deterioration for the colour gamut of the inkjet inks. For example, a black ink receiver may be given a white colour for obtaining a better reproduction of the wood colours.

A colourless ink may be applied of the jetted colour inks to give the wood colour a glossy look, for example, similar to that of real wood covered by a glossy varnish. Alternatively, the colourless ink may also be used for producing a mat appearance for example, similar to that of bleached wood.

Another situation where a colourless ink may be applied is when it is desirable to have an improved wear resistance. Often such a colourless ink, including e.g. a melamine resin, has a too high viscosity for inkjet printing but can then be applied by other techniques such as flexography or screen printing.

In the black inkjet ink, the cyan inkjet ink and the two inkjet inks (A) and (B), the pigments are preferably present in the range of 0.05 to 20%, more preferably in the range of 0.1 to 10% by weight and most preferably in the range of 0.2 to 6% by weight, each based on the total weight of the inkjet ink.

In a preferred embodiment, the pigment concentration of inks (A) and (B) is each less than 1.0 wt % based on the total weight of the inkjet ink.

The viscosity of the inkjet inks is preferably smaller than 20 mPa·s at 45° C. and at a shear rate of 1,000 s$^{-1}$, more preferably between 2 and 15 mPa·s at 45° C. and at a shear rate of 1,000 s$^{-1}$. The viscosity of an inkjet ink measured at 45° C. with the "Robotic Viscometer Type VISCObot" from CAMBRIDGE APPLIED SYSTEMS corresponds to the viscosity measured at 45° C. and at a shear rate of 1,000 s$^{-1}$.

The surface tension of the inkjet inks is preferably in the range of about 16 mN/m to about 70 mN/m at 25° C., more preferably in the range of about 18 mN/m to about 40 mN/m at 25° C.

The inks may further also contain at least one surfactant for obtaining good spreading characteristics on a substrate.

The radiation curable inks may further also contain at least one polymerization inhibitor for improving the thermal stability of the ink.

Inkjet Inks (A)

The inkjet ink (A) preferably has a hue angle H* between 70 and 85 and a chroma C* between 30 and 80, more preferably a hue angle H* between 75 and 83 and a chroma C* between 35 and 55;

In a preferred embodiment, the inkjet ink (A) includes a mixture of a yellow pigment and an orange pigment, more preferably a mixture yellow pigment and C.I. Pigment Orange 71, most preferably a mixture of C.I. Pigment Yellow 139 and C.I. Pigment Orange 71.

The total concentration of pigments in the inkjet ink (A) is preferably less than 3 wt %, more preferably less than 2 wt % based on the total weight of the inkjet ink.

The inkjet ink (A) is preferably a radiation curable inkjet ink, more preferably a UV-curable inkjet ink.

Inkjet Inks (B)

The inkjet ink (B) preferably has a hue angle H* between 20 and 40 and a chroma C* between 30 and 80, preferably a hue angle H* between 20 and 40 and a chroma C* between 30 and 70, and most preferably a hue angle H* between 25 and 35 and a chroma C* between 35 and 60.

In a preferred embodiment, the inkjet ink (B) includes a mixture of at least one red pigment and an orange pigment.

In a preferred embodiment, the inkjet ink (B) includes a mixture of C.I. Pigment Orange 71 and a pigment selected from the group consisting of C.I. Pigment Violet 19, C.I. Pigment Red 122, C.I. Pigment Red 254, C.I. Pigment Red 202 and C.I. Pigment Red 57:1.

In a more preferred embodiment, the inkjet ink (B) includes a mixture of C.I. Pigment Red 254, C.I. Pigment Red 122 and C.I. Pigment Orange 71. In an even more preferred embodiment, the inkjet ink (B) further includes C.I. Pigment Violet 23 and/or C.I. Pigment Blue 61.

The total concentration of pigments in the inkjet ink (B) is preferably less than 3 wt %, more preferably less than 2 wt % based on the total weight of the inkjet ink.

The inkjet ink (B) is preferably a radiation curable inkjet ink, more preferably a UV-curable inkjet ink.

Cyan Inkjet Inks

The cyan inkjet ink is preferably a radiation curable inkjet ink, more preferably a UV-curable inkjet ink.

This pigment for the cyan inkjet ink may be chosen from those disclosed by HERBST, Willy, et al. Industrial Organic Pigments, Production, Properties, Applications. 3rd edition. Wiley—VCH, 2004. ISBN 3527305769.

Particular preferred pigments are C.I. Pigment Blue 15:1, 15:2, 15:3, 15:4, 15:6, 16, 56, 61 and (bridged) aluminium phthalocyanine pigments.

In the most preferred embodiment, the pigment for the cyan inkjet ink is selected from the group consisting of C.I. Pigment Blue 15:3 and C.I. Pigment Blue 15:4. These pigments combine excellent colour characteristics with excellent light fading stability.

The cyan inkjet ink is preferably a radiation curable inkjet ink, more preferably a UV-curable inkjet ink.

Black Inkjet Inks

The black inkjet ink is preferably a radiation curable inkjet ink, more preferably a UV-curable inkjet ink.

Carbon black is preferred as a pigment for the black inkjet ink. Suitable black pigment materials include carbon blacks such as Pigment Black 7 (e.g. Carbon Black MA8™ from MITSUBISHI CHEMICAL), Regal™ 400R, Mogul™ L, Elftex™ 320 from CABOT Co., or Carbon Black FW18, Special Black 250, Special Black 350, Special Black 550, Printex™ 25, Printex™ 35, Printex™ 55, Printex™ 90, Printex™ 150T from DEGUSSA. Additional examples of suitable pigments are disclosed in U.S. Pat. No. 5,389,133 (XEROX).

It is also possible to make mixtures of pigments in the black inkjet ink. For some applications, a neutral black inkjet ink is preferred and can be obtained, for example, by mixing a black pigment, a cyan pigment and optionally also a magenta pigment, into the inkjet ink as disclosed by EP 1593718 A (AGFA).

White Inks

The white inkjet ink is preferably a radiation curable inkjet ink, more preferably a UV-curable inkjet ink.

The white ink may contain an organic or inorganic white pigment. The white pigment may consist of a hollow particle, but preferably the white pigment comprises at least one of inorganic hollow particles or inorganic-organic hybrid hollow particles as disclosed in e.g. EP 1818373 A (FUJI-FILM).

The white ink most preferably includes a pigment with a refractive index greater than 1.60, preferably greater than 2.00, more preferably greater than 2.50 and most preferably greater than 2.60. Suitable pigments are given by Table 1. The white pigments may be employed singly or in combination. Preferably titanium dioxide is used for the pigment with a refractive index greater than 1.60.

TABLE 1

| C.I. Number | Chemical name | CAS RN |
| --- | --- | --- |
| Pigment white 1 | Lead hydroxide carbonate | 1319-46-6 |
| Pigment white 3 | Lead sulfate | 7446-14-2 |
| Pigment white 4 | Zinc oxide | 1314-13-2 |
| Pigment white 5 | Lithopone | 1345-05-7 |
| Pigment white 6 | Titanium dioxide | 13463-67-7 |

TABLE 1-continued

| C.I. Number | Chemical name | CAS RN |
| --- | --- | --- |
| Pigment white 7 | Zinc sulfide | 1314-98-3 |
| Pigment white 10 | Barium carbonate | 513-77-9 |
| Pigment white 11 | Antimony trioxide | 1309-64-4 |
| Pigment white 12 | Zirconium oxide | 1314-23-4 |
| Pigment white 14 | Bismuth oxychloride | 7787-59-9 |
| Pigment white 17 | Bismuth subnitrate | 1304-85-4 |
| Pigment white 18 | Calcium carbonate | 471-34-1 |
| Pigment white 19 | Kaolin | 1332-58-7 |
| Pigment white 21 | Barium sulfate | 7727-43-7 |
| Pigment white 24 | Aluminum hydroxide | 21645-51-2 |
| Pigment white 25 | Calcium sulfate | 7778-18-9 |
| Pigment white 27 | Silicon dioxide | 7631-86-9 |
| Pigment white 28 | Calcium metasilicate | 10101-39-0 |
| Pigment white 32 | Zinc phosphate cement | 7779-90-0 |

Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention as the white pigment. The use of the anatase type having a low density and a small particle size can achieve superior dispersion stability, ink storage stability and ejectability. The rutile type can reduce the total amount of titanium oxide, leading to improved storage stability and ejection performance of ink. The two different crystalline forms may also be used in combination as the white pigment.

For surface treatment of the titanium oxide, an aqueous treatment or a gas phase treatment may be applied, and an alumina-silica treating agent is preferably employed. Untreated-, alumina treated- or alumina-silica treated-titanium oxide are employable.

Preferred titanium dioxide pigments include one or more metal oxide surface coatings (such as silica, alumina, alumina-silica, boric acid, and zirconia) preferably present in an amount of from 0.1 wt % to 10 wt %, and preferably from 0.5 wt % to 3 wt %, based on the total weight of the titanium dioxide pigment. These coatings can provide improved properties including reducing the photoreactivity of the titanium dioxide. Commercial examples of such coated titanium dioxides include TiPure™ R700 and R900 (alumina-coated, available from E.I. DuPont de Nemours, Wilmington Del.), RDIS (alumina-coated, available from Kemira Industrial Chemicals, Helsinki, Finland), TiPure™ R796 (alumina and phosphate treated from DuPont), TiPure™ R706 (silica and alumina treated, available from DuPont, Wilmington Del.) and Tioxide™ TR52, a surface modified titanium dioxide from Huntsman Chemical Group. In a preferred embodiment, the titanium dioxide pigment is silica and alumina treated titanium dioxide pigment.

Pigment particles in a white inkjet ink should be sufficiently small and narrow in distribution to permit free flow of the ink through the inkjet-printing device, especially at the ejecting nozzles. When the average diameter of the white pigment exceeds 500 nm the jet-out suitability of the white ink tends to be degraded. On the other hand, sufficient hiding power cannot be obtained when the average diameter is less than 100 nm, or even 50 nm. The numeric average particle diameter of the titanium oxide is preferably from 150 to 500 nm, more preferably from 200 to 400 nm, and most preferably from 230 to 350 nm.

The determination of the numeric average particle diameter is best performed by photon correlation spectroscopy at a wavelength of 633 nm with a 4 mW HeNe laser on a diluted sample of the pigmented inkjet ink. A suitable particle size analyzer is Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

The white (inkjet) ink preferably comprises the white pigment in an amount of at least 5 wt %, more preferably 10 wt % and most preferably 15 wt % of white pigment based upon the total weight of the white inkjet ink.

The white ink preferably contains one or more polymerizable compounds in an amount preferably higher than 60 wt % based on the total weight of the inkjet ink.

Colourless Inks

The inkjet ink set according to a preferred embodiment of the present invention may include a colourless ink, preferably a radiation curable colourless ink, more preferably a UV-curable colourless ink.

The colourless ink is most preferably an inkjet ink, but sometimes this is not possible. For example, when an improved wear resistance is desired, then often polymers are used that have a too high viscosity for inkjet printing. Other techniques such as flexography or screen printing are then preferably employed.

Normally no pigment is included in the colourless ink, but for some purposes such as the desired mat appearance or for influencing friction or adhesion a pigment may be included. However, with a pigment present the layer of the colourless ink should be substantially transparent so that the colour pattern of the colour inkjet inks beneath remains visible.

Dispersion Media

The dispersion medium used in the (inkjet) ink is a liquid. The dispersion medium may consist of water and/or organic solvent(s). Preferably the dispersion medium is water.

If the (inkjet) ink is radiation curable (inkjet) inks, water and/or organic solvents are replaced by one or more polymerizable compounds to obtain a liquid dispersion medium. Sometimes, it can be advantageous to add a small amount of an organic solvent to improve the dissolution of the dispersant. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The radiation curable (inkjet) ink preferably contain no water. However sometimes a small amount, generally less than 5 wt % of water based on the total weight of the ink, can be present. This water was not intentionally added but came into the composition via other components as a contamination, such as for example polar organic solvents. Higher amounts of water than 5 wt % tend to make the non-aqueous liquids and inks instable, preferably the water content is less than 1 wt % based on the total weight of radiation curable ink and most preferably no water at all is present Suitable organic solvents include alcohols, aromatic hydrocarbons, ketones, esters, aliphatic hydrocarbons, higher fatty acids, carbitols, cellosolves, and higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

In a preferred embodiment, the organic solvent includes at least one polyalkyleneglycol dialkylether, preferably having a molecular weight of at least 250. In a preferred embodiment the polyalkyleneglycol dialkylether is a polyethyleneglycol dialkylether.

In a preferred embodiment, the dispersion medium includes a polyalkyleneglycol derivative selected from the group consisting of polyalkyleneglycol monoalkyl ether acetates and polyalkyleneglycol monoalkyl ethers. In another more preferred embodiment the polyalkyleneglycol monoalkyl ether is selected from the group consisting of triethyleneglycol monobutyl ether and tripropyleneglycol monomethylether.

Polymerizable Compounds

Any polymerizable compound commonly known in the art may be employed and includes any monomer, oligomer and/or prepolymer as long it allows obtaining a viscosity suitable for inkjet printing. A combination of monomers, oligomers and/or prepolymers may also be used and they may possess different degrees of functionality. A mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is rather expensive and slow, especially under conditions of high relative humidity. If cationic polymerization is used, it is preferred to use an epoxy compound together with an oxetane compound to increase the rate of polymerization. Radical polymerization is the preferred polymerization process and preferably one or more acrylates are used as monomers and oligomers.

Particularly preferred monomers and oligomers are those listed in [0106] to [0115] of EP 1911814 A (AGFA GRAPHICS).

Suitable examples of cationically curable compounds can be found in Advances in Polymer Science, 62, pages 1 to 47 (1984) by J. V. Crivello.

The cationic polymerizable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

A preferred class of monomers and oligomers which can be used in both radiation and cationically curable compositions are vinyl ether acrylates such as those described in U.S. Pat. No. 6,310,115 (AGFA). Particularly preferred compounds are 2-(2-vinyloxyethoxy)ethyl (meth)acrylate, most preferably the compound is 2-(2-vinyloxyethoxy)ethyl acrylate.

Polymeric Dispersants

The pigments are preferably dispersed by a polymeric dispersant.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS).

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from NOVEON;
- TEGOT™ DISPERS™ dispersants from EVONIK;
- EDAPLAN™ dispersants from MUNZING CHEMIE;
- ETHACRYLT™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON. The polymeric dispersant is preferably used in an amount of 2 to 600 wt %, more preferably 5 to 200 wt %, most preferably 50 to 90 wt % based on the weight of the pigment.

Initiators

The radiation curable (inkjet) ink preferably also contains an initiator. The initiator typically initiates the polymerization reaction. The initiator can be a thermal initiator, but is preferably a photo-initiator. The photo-initiator requires less energy to activate than the monomers, oligomers and/or prepolymers to form a polymer. The photo-initiator suitable for use in the curable inkjet ink may be a Norrish type I initiator, a Norrish type II initiator or a photo-acid generator.

In a preferred embodiment, the photoinitiator is a free radical initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For safety reasons, the photoinitiator is preferably a so-called diffusion hindered photoinitiator. A diffusion hindered photoinitiator is a photoinitiator which exhibits a much lower mobility in a cured layer of the ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA). A preferred amount of photoinitiator is 0-50 wt %, more preferably 0.1-20 wt %, and most preferably 0.3-15 wt % of the total weight of the curable ink.

In order to increase the photosensitivity further, the radiation curable ink may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpho line;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

When one or more co-initiators are included into the radiation curable ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA).

The radiation curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The radiation curable (inkjet) ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, 5110, 5120 and 5130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total (inkjet) ink.

Surfactants

The (inkjet) ink may contain at least one surfactant. The surfactant(s) can be anionic, cationic, non-ionic, or zwitterionic and are usually added in a total quantity less than 20 wt % based on the total weight of the ink and particularly in a total less than 10 wt % based on the total weight of the ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous (inkjet) inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a radiation curable (inkjet) ink a fluorinated or silicone compound as disclosed above may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

The inkjet inks based on water and/or organic solvents preferably include a humectant and/or penetrant.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol.

The humectant is preferably added to the inkjet ink in an amount of 0.1 to 40 wt % of the formulation, more preferably 0.1 to 10 wt % of the ink, and most preferably approximately 4.0 to 6.0 wt %.

Preparation of Pigment Dispersions and Inks

Pigment dispersions for inks may be prepared by precipitating or milling the pigment in the dispersion medium in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build up of heat, and for radiation curable pigment dispersions as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Colour Patterns and Decorative Panels

The colour inkjet inks of the ink set are used for printing a colour pattern. The decorative layer printed by the inkjet inks has a colour pattern which is preferably the image of a wood surface, wood surface, including printing of the nerves of the specific wood pattern. It may be printed on a paper for producing a decorative paper. The paper has the advantage that the colour pattern may be printed onto the paper off-line prior to the production process of the decorative panels.

Instead of a decorative paper, the colour pattern can also be printed on other ink receivers, such as a metal or plastic foil thereby producing a decorative metal foil or a plastic foil. For these ink receivers, preferably the inkjet printing is performed using radiation curable inkjet inks. If the colour pattern is printed using radiation curable inkjet inks, then the inkjet printing device is preferably integrated into the production process, resulting in elimination of waiting times and waste; in its most preferred way the inkjet printing device is incorporated into the production line, as so called in-line inkjet printing process.

A decorative panel including an inkjet printed colour pattern is preferably selected from the group consisting of flooring, kitchen, furniture and wall panels. The decorative panels may include high pressure laminates. They may comprise a support layer for supporting the decorative layer and/or an abrasive overlay for protecting the decorative layer.

Preferred decorative panels include MDF and HDF, because they do not contain knots or rings and are thus more uniform, which allows direct printing by radiation curable inkjet inks. High-density fibreboard (HDF), also called hardboard, is an engineered wood product. It is similar to particle board and medium-density fibreboard (MDF), but is denser, much stronger and harder because it is made out of exploded wood fibres that have been highly compressed. The density of hardboard is usually 800-1040 kg/m$^3$. It differs from particle board in that the bonding of the wood fibres requires no additional materials, although resin is often added. Hardboard is produced in either a wet or dry process. The wet process leaves only one smooth side while the dry processed hardboard is smooth on both sides. The smooth side is used for inkjet printing.

The density of MDF is usually in the range 600-850 kg/m$^3$. MDF is an engineered wood product formed by breaking down hardwood or softwood residuals into wood fibres, often in a defibrator, combining it with wax and a resin binder, and forming panels by applying high temperature and pressure. It is stronger and much denser than normal particle board.

Such panels may be combined with other materials. For example, a table having a HDF top surface may include an ABS material as the table edge for a higher impact resistance. Another example is a door having an inkjet printed colour pattern imitating the colour and pattern of a real wood decorative profile glued to it. The inkjet ink set according to a preferred embodiment of present invention allows not only a good colour match but also a good metamerism between the different materials.

The decorative face of a panel may simulate the visual effect of a distressed panel. In order to obtain such an effect, this may involve passing the panel with respect to two or more distressing tools, such as embossing rolls. The distressing tools are provided with an operative surface that can be put in contact with the moving panels, wherein said operative surface is structured or relieved, such that it bears protrusions having the negative elevations of distressing marks, such as chisel marks, saw cut lines, wear traces, chipped-of edges, etcetera. In this way, for example, the distressing marks of aged flooring are transferred to fresh floor panels in a convincing way.

Inkjet Printing Devices

The inkjet inks of the ink set according to a preferred embodiment of the present invention may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

Curing Devices

The inkjet inks can be cured by exposing it to actinic radiation, preferably by ultraviolet radiation.

In inkjet printing, the curing device may be arranged in combination with the print head of the inkjet printer, travelling therewith so that the curable ink is exposed to curing radiation very shortly after been jetted.

In such an arrangement, it can be difficult to provide a small enough radiation source connected to and travelling with the print head. Therefore, a static fixed radiation source may be employed, e.g. a source of curing UV-light, connected to the radiation source by means of flexible radiation conductor such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Methods of Inkjet Printing

The method of inkjet printing according to a preferred embodiment of the present invention includes the step of inkjet printing a colour pattern using the inkjet ink set as defined above.

In a preferred embodiment, the method of inkjet printing includes the following steps:

1) inkjet printing a colour pattern on paper to produce a decorative paper;
2) impregnating the decorative paper with a resin;
3) impregnating an overlay paper with a resin to be used as a wear coating; and
4) applying the decorative paper and the overlay paper on a mostly wood-based core by means of a short cycle embossing press and optionally at the same time creating relief in at least the wear coating. The resin used in step b) and/or c) is well-known and include resins or combination of resins selected from the group consisting of melamine resin, urea resin, acrylate dispersion, acrylate copolymer dispersion and polyester resins, but is preferably a melamine resin. The mostly wood-based core used in step d) is preferably MDF or HDF. In a more preferred embodiment, the decorative paper and the overlay paper are applied on a mostly wood-based core by means of a short cycle embossing press and at the same time a relief is created in at least the wear coating In another preferred embodiment, the method of inkjet printing includes the following steps:

a) inkjet printing a colour pattern; and
b) applying a transparent wear coating on top of the printed colour pattern. The colour pattern may be printed on a support not based on wood, such as a polymeric foil, or directly on a wood-based core, but preferably the colour pattern is printed directly on a wood-based core using radiation curable inkjet inks. If the colour pattern is printed on a support not based on wood then the method of inkjet printing preferably includes a step c) of applying the printed pattern and the wear coating on a core. In a preferred embodiment the method of inkjet printing includes a step of providing a relief in at least the wear coating, preferably by means of a short cycle embossing press.

The decorative panel obtained from the above inkjet printing methods include at least:

1) a transparent, preferably melamine based, wear coating;
2) an inkjet printed colour pattern;
3) a core, preferably an MDF or HDF core;

and optionally 4) a relief at an upper surface. In a preferred embodiment, the decorative panel includes the relief at the upper surface. In a preferred embodiment, the decorative panel has an AC3 classification, more preferably an AC4 classification in accordance with EN 13329.

In another preferred embodiment, the method of inkjet printing includes the step of inkjet printing a colour pattern on a substantially non-absorbing ink receiver. In a more preferred embodiment, the substantially non-absorbing ink receiver is a polymeric substrate, such as ABS, used as a furniture side band.

Preferred methods of inkjet printing according to the present invention include:

decoration printing of wood patterns on non-decorated substrates for improving the decorative function, e.g. in combination with natural wood decoration or in combination with other types of printed decoration materials (e.g. laminates on the basis of printed deco paper);

printing of furniture side bands (in combination with wood panels or laminate panels;

printing of wood patterns on non-wood substrates (in combination with natural wood);

printing of wood pattern on cheap substrates (fibreboard, . . . );

printing of wood patterns on durable materials (metals, MDF, HDF panels); and printing of wood patterns on floors, furniture materials, ceilings, wall decoration, but also on objects (e.g. light switches) in order to have a non-disturbed wood decoration effect.

EXAMPLES

Materials

All materials used in the following examples were readily available from standard sources such as Aldrich Chemical Co. (Belgium) and Acros (Belgium) unless otherwise specified.

PB15:4 is an abbreviation used for Hostaperm™ Blue P-BFS, a C.I. Pigment Blue 15:4 pigment from CLARIANT.

PY150 is an abbreviation used for Chromophtal™ Yellow LA2, a C.I. Pigment Yellow 150 from CIBA SPECIALTY CHEMICALS.

PR122 is the abbreviation for C.I. Pigment Red 122 for Ink Jet Magenta™ E02VP2621 from CLARIANT was used.

PO71 is the abbreviation for C.I. Pigment Orange 71 for Chromophtal™ Orange DPP from BASF was used.

PR254 is the abbreviation for C.I. Pigment Red 254 for which Irgazin™ DPP Red BTR from Ciba Specialty Chemicals was used.

PY139 is Graphtol™ Yellow H2R VP2284, a C.I. Pigment Yellow 139 from CLARIANT.

PMIX is Cromophtal™ Jet Magenta 2BC which is a mixed crystal of C.I. Pigment Violet 19 and C.I. Pigment Red 202 available from CIBA-GEIGY.

PB7 is an abbreviation used for Special Black™ 550, which is a carbon black available from EVONIK DEGUSSA.

S35000 is SOLSPERSE™ 35000, a polyethyleneimine-polyester hyperdispersant from NOVEON.

S35000 SOL is a 40% solution of S35000 in DPGDA.

SYN is the dispersion synergist according to Formula (A):

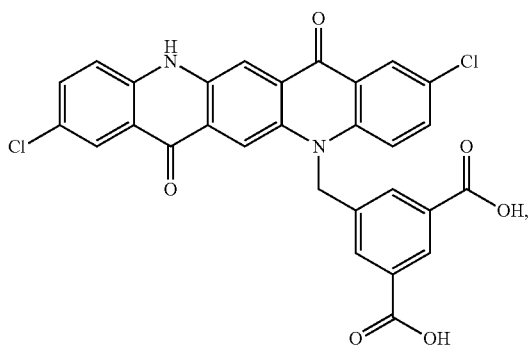

Formula (A)

and was synthesized in the same manner as described in Example 1 of WO 2007/060254 (AGFA GRAPHICS) for the synergist QAD-3.

DPGDA is dipropyleneglycoldiacrylate from SARTOMER. TMPTA is trimethylolpropane triacrylate available as Sartomer™ SR351 from SARTOMER.

ITX is Darocur™ ITX is an isomeric mixture of 2- and 4-isopropylthioxanthone from CIBA SPECIALTY CHEMICALS.

Irgacure™ 907 is 2-methyl-1-[4-(methylthio)phenyl]-2-morpholino-propan-1-one, a photoinitiator available from CIBA SPECIALTY CHEMICALS.

EPD is ethyl 4-dimethylaminobenzoate available as GENOCURE™ EPD from RAHN AG.

INHIB is a mixture forming a polymerization inhibitor having a composition according to Table 2.

TABLE 2

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

Byk™-333 is a surfactant available from BYK CHEMIE GMBH.

PGA is a 140 g/m² white paper substrate coated on both sides with 20 g/m² of polyethylene available from Mondi Belcoat NV Coating division by using order code 6001764.

ABS is a an ABS substrate with white coating available from CLEAF SPA (Italy) having the following CIE L* a* b* coordinates:

| CIE L* a* b* | Value |
|---|---|
| L* | 69.8 |
| a* | 8.1 |
| b* | 11.0 |

Measurement Methods

Metameric Index

For metamerism, two materials are considered. For example, in case of deco printing of wood colours, the first (or reference) material would be a piece of natural wood of some kind or a kitchen cabinet door, produced with roto gravure techniques. The second material would be a best possible reproduction of that first material by means of inkjet printing.

The reflectance spectrum of both materials is calculated for a selected set of light sources out of a list of 19 light sources:

Equi-energetic light source: CIE illuminant E
  Daylight: D50, D55, D65
  CIE standard illuminants: A (tungsten filament), B (direct daylight), C (shady daylight)
  Fluorescent: CIE F-series F1 up to F12

The spectrum started at 380 nm and went up to 730 nm in steps of 10 nm. Calculation involved the reflectance spectrum of the material in combination with the light source spectrum. The CIE L* a* b* coordinates for a 2° observer as well as chroma C* and hue angle H* were calculated for each material and for each light source.

For each light source, the difference values for $\Delta L^*$, $\Delta a^*$, $\Delta b^*$, $\Delta C^*$, $\Delta H^*$ and the colour-distance $\Delta E^*94$ were calculated for the two materials, i.e. the natural wood material and the printed material. This delivered 19 sets of difference values for each natural wood sample and an inkjet printed material. Simple descriptive statistics on the 19 sets of difference values was calculated.

The metameric index for the 2 materials was defined as three times the standard deviation of $\Delta E^*94$. The smaller the metameric index, the less colour difference between the 2 materials will be seen when they are compared to each other whilst changing light source within the selected set of 19 light sources. For a true reproduction of wood colours having minimal metamerism, the metameric index should have a value of no more than 1.0.

Preparation of Inkjet Inks

The following concentrated pigment dispersions were prepared and used to obtain the inkjet inks Black ink, Cyan ink, Magenta ink A and Yellow ink A with a composition according to Table 9.

Preparation of Concentrated Black Pigment Dispersion

A concentrated black pigment dispersion was prepared by mixing for 30 minutes the components according to Table 3 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 8 hours at a flow rate of about 2 L per minute and a rotation speed in the mill of about 13 m/s. After milling the dispersion was separated from the beads using a filter cloth. The dispersion was then discharged into a 20 L vessel.

TABLE 3

| Component | Quantity (in g) |
|---|---|
| PB7 | 1394 |
| PB15:4 | 503 |
| PMIX | 503 |
| SYN | 15 |
| S35000 SOL | 6000 |
| INHIB | 150 |
| DPGDA | 6435 |

Preparation of Concentrated Cyan Pigment Dispersion

A concentrated cyan pigment dispersion was prepared by mixing for 30 minutes the components according to Table 4 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 4

| Component | Quantity (in g) |
|---|---|
| PB15:4 | 1120 |
| S35000 SOL | 2800 |
| INHIB | 70 |
| DPGDA | 3010 |

Preparation of Concentrated Magenta Pigment Dispersion A

A concentrated magenta pigment dispersion DIS-M was prepared by mixing for 30 minutes the components according to Table 5 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 5

| Component | Quantity (in g) |
|---|---|
| PMIX | 1120 |
| SYN | 17 |
| S35000 SOL | 2800 |
| INHIB | 70 |
| DPGDA | 2993 |

Preparation of Concentrated Yellow Pigment Dispersion A

A concentrated yellow pigment dispersion was prepared by mixing for 30 minutes the components according to Table 6 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 6

| Component | Quantity (in g) |
|---|---|
| PY150 | 1120 |
| S35000 SOL | 2800 |
| INHIB | 70 |
| DPGDA | 3010 |

The following pigment dispersions were prepared and used to obtain the inkjet inks Magenta ink B and Yellow ink B according to Table 9.

Preparation of Concentrated Magenta Pigment Dispersion B

A concentrated magenta pigment dispersion was prepared by mixing for 30 minutes the components according to Table 7 in a 20 L vessel. The vessel was then connected to a Bachofen DYNOMILL ECM Pilot mill having an internal volume of 1.5 L filled for 42% with 0.4 mm yttrium stabilized zirconia beads. The mixture was circulated over the mill for 8 hours at a flow rate of about 1.5 L per minute and a rotation speed in the mill of about 13 m/s. After milling the dispersion was separated from the beads using a filter cloth. The dispersion was then discharged into a 10 L vessel.

TABLE 7

| Component | Quantity (in g) |
|---|---|
| PR122 | 795 |
| PO71 | 735 |
| PR254 | 720 |
| SYN | 150 |
| S35000 SOL | 5625 |
| INHIB | 150 |
| DPGDA | 6825 |

Preparation of Concentrated Yellow Pigment Dispersion B

A concentrated yellow pigment dispersion was prepared by mixing for 30 minutes the components according to Table 8 in a 20 L vessel. The vessel was then connected to a Bachofen DYNOMILL ECM Pilot mill having an internal volume of 1.5 L filled for 42% with 0.4 mm yttrium stabilized zirconia beads. The mixture was circulated over the mill for 8 hours at a flow rate of about 1.5 L per minute and a rotation speed in the mill of about 13 m/s. After milling the dispersion was separated from the beads using a filter cloth. The dispersion was then discharged into a 10 L vessel.

TABLE 8

| Component | Quantity (in g) |
|---|---|
| PY139 | 1283 |
| PO71 | 968 |
| SYN | 150 |
| S35000 SOL | 5625 |
| INHIB | 150 |
| DPGDA | 6824 |

The composition of the inkjet inks using the above concentrated pigment dispersions is given by Table 9.

TABLE 9

| wt % of component | Black ink | Cyan ink | Magenta ink A | Magenta ink B | Yellow ink A | Yellow ink B |
|---|---|---|---|---|---|---|
| PB7 | 2.25 | — | — | — | — | — |
| PB15:4 | 0.81 | 3.00 | — | — | — | — |
| PMIX | 0.81 | — | 3.40 | — | — | — |
| PR122 | — | — | — | 0.28 | — | — |
| PO71 | — | — | — | 0.26 | — | 0.20 |
| PR254 | — | — | — | 0.24 | — | — |
| PY150 | — | — | — | — | 2.70 | — |
| PY139 | — | — | — | — | — | 0.26 |
| S35000 | 3.87 | 3.00 | 3.40 | 0.79 | 2.70 | 0.46 |
| SYN | 0.24 | — | 0.05 | 0.01 | — | 0.003 |
| ITX | 2.00 | 2.00 | 2.00 | 2.00 | 2.00 | 2.00 |

TABLE 9-continued

| wt % of component | Black ink | Cyan ink | Magenta ink A | Magenta ink B | Yellow ink A | Yellow ink B |
|---|---|---|---|---|---|---|
| EPD | 2.50 | 2.50 | 2.50 | 2.50 | 2.50 | 2.50 |
| Irgacure ™ 907 | 4.00 | 4.00 | 4.00 | 4.00 | 4.00 | 4.00 |
| Byk ™ 333 | 0.50 | 0.50 | 0.50 | 0.50 | 0.50 | 0.50 |

Two ink sets were prepared with the above inkjet inks. A first ink set A included the black ink, the cyan ink, the magenta ink A and the yellow ink A. The second ink set B included the black ink, the cyan ink, the magenta ink B and the yellow ink B.

Each inkjet ink was coated on the PGA substrate with a bar coater at a wet thickness of 8 μm and then UV cured on a Fusion DRSE-120 conveyer using a D bulb at full power (600 mJ/cm$^2$) and a belt speed of 20 m/min.

The reflectance spectrum of all coatings was measured with a Gretag SPM50 spectrophotometer. The CIE L* a* b* coordinates as well as chroma C* and hue angle H* were determined for each coating for a 2° observer under a D50 light source. The results are shown in Table 10.

TABLE 10

| Inkjet Ink | L* | a* | b* | C* | H* |
|---|---|---|---|---|---|
| Black ink | 8.5 | 1.3 | −1.0 | 1.7 | 322.6 |
| Cyan ink | 49.4 | −38.8 | −53.9 | 66.4 | 234.3 |
| Magenta ink A | 55.4 | 76.7 | −7.1 | 77.1 | 354.7 |
| Magenta ink B | 69.1 | 45.3 | 21.1 | 50.0 | 25.0 |
| Yellow ink A | 88.9 | −7.3 | 90.9 | 91.2 | 94.6 |
| Yellow ink B | 87.4 | 8.6 | 45.3 | 46.1 | 79.2 |

Evaluation and Results

Natural wood samples of oak and cherry were selected in a timber store. The reflectance spectrum of each wood sample was measured three times with a Gretag SPM50 spectrophotometer in the range from 380 up to 730 nm in steps of 10 nm. The CIE L* a* b* coordinates for a 2° observer as well as chroma C* and hue angle H* were calculated for each material and for the light source D50. The results are shown in Table 11.

TABLE 11

| Wood Sample | Measurement | L* | a* | b* | C* | H* |
|---|---|---|---|---|---|---|
| Oak | #1 | 37.1 | 10.6 | 19.8 | 22.5 | 61.8 |
|  | #2 | 37.1 | 10.6 | 19.8 | 22.4 | 61.9 |
|  | #3 | 8.2 | 10.3 | 20.3 | 22.8 | 63.0 |
| Cherry | #1 | 45.9 | 26.9 | 46.7 | 53.9 | 60.0 |
|  | #2 | 47.7 | 26.3 | 46.6 | 53.6 | 60.6 |
|  | #3 | 48.0 | 26.6 | 47.0 | 54.0 | 60.5 |

After taking the average of the three measurements, a colour simulation tool was used for matching each of the two sets of L* a* b* values of the wood samples as close as possible with a mixture of the inks of ink set A respectively ink set B on the ABS substrate. The compositions of the mixtures are shown in Table 12 for ink set A and in Table 13 for ink set B.

TABLE 12

| wt % of Component | Wood sample | |
|---|---|---|
|  | Oak | Cherry |
| Black ink | 19.40 | — |
| Cyan ink | — | 2.35 |
| Magenta ink A | 13.20 | 17.55 |
| Yellow ink A | 22.00 | 38.00 |
| DPGDA | 45.40 | 42.10 |

TABLE 13

| wt % of Component | Wood sample | |
|---|---|---|
|  | Oak | Cherry |
| Black ink | 9.90 | 1.93 |
| Cyan ink | — | — |
| Magenta ink B | 19.75 | 27.80 |
| Yellow ink B | 39.70 | 66.66 |
| DPGDA | 30.65 | 3.61 |

Each mixture was coated x times (for x see Table 14) on the ABS substrate with a bar coater at a wet thickness of 8 μm and then UV cured on a Fusion DRSE-120 conveyer using a D bulb at full power (600 mJ/cm$^2$) and a belt speed of 20 m/min after each coating for x>1.

The reflectance spectrum of all coatings was measured with the same Gretag SPM50 spectrophotometer as used for measuring the natural wood samples. The CIE L* a* b* coordinates for a 2° observer as well as chroma C* and hue angle H* were calculated for each material and for the light source D50. The results are shown in Table 14 together with the average values for the natural wood samples.

TABLE 14

| Origin | Type | x | L* | a* | b* | C* | H* |
|---|---|---|---|---|---|---|---|
| Natural Wood | Oak | n.a. | 37.5 | 10.5 | 19.9 | 22.5 | 62.2 |
| Inkset A | Oak | 1 | 37.4 | 9.0 | 16.8 | 19.1 | 61.7 |
| Inkset B | Oak | 2 | 35.4 | 10.4 | 17.3 | 20.2 | 58.9 |
| Natural Wood | Cherry | n.a. | 47.2 | 26.6 | 46.8 | 53.8 | 60.4 |
| Ink set A | Cherry | 2 | 46.0 | 22.5 | 41.0 | 46.8 | 61.2 |
| Ink set B | Cherry | 3 | 44.9 | 25.7 | 39.7 | 47.3 | 57.1 |

It can be seen from Table 14 that the "wood imitations" made with the ink sets A and B matched fairly good with the natural wood under the light source D50.

The metamerism index was then determined for the natural wood sample and the corresponding coated sample of ink set A respectively ink set B. The results is shown in Table 15

TABLE 15

| Wood type | Metamerism index | |
|---|---|---|
|  | Ink set A | Ink set B |
| Oak | 0.6 | 0.5 |
| Cherry | 1.5 | 0.9 |

From Table 15, it can be seen that only ink set B was capable of exhibiting minimal colour differences between the natural wood samples and their corresponding coated samples when switching between the 19 light sources.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An inkjet ink set consisting of:
 a black inkjet ink, a cyan inkjet ink, and two inkjet inks A and B, optionally complemented by a white inkjet ink and/or a colourless inkjet ink; wherein
 the inkjet ink A has a hue angle H* between 70 and 85 and a chroma C* between 30 and 80;
 the inkjet ink B has a hue angle H* between 20 and 40 and a chroma C* between 30 and 80; and
 CIE L* a* b* coordinates are determined on a polyethylene coated white paper for a 2° observer under a D50 light source and used to calculate the hue angle H* and the chroma C* of the inkjet ink A and the inkjet ink B.

2. The inkjet ink set according to claim 1, wherein at least one of the two inkjet inks A and B includes a mixture of at least two pigments.

3. The inkjet ink set according to claim 2, wherein the inkjet ink A includes a mixture of a yellow pigment and an orange pigment.

4. The inkjet ink set according to claim 3, wherein the inkjet ink A includes a mixture of C.I. Pigment Orange 71 and C.I. Pigment Yellow 139.

5. The inkjet ink set according to claim 1, wherein the inkjet ink B includes a mixture of a red pigment and an orange pigment.

6. The inkjet ink set according to claim 5, wherein the inkjet ink B includes a mixture of C.I. Pigment Red 254, C.I. Pigment Red 122, and C.I. Pigment Orange 71.

7. The inkjet ink set according to claim 6, wherein the inkjet ink B further includes C.I. Pigment Violet 23 and/or C.I. Pigment Blue 61.

8. The inkjet ink set according to claim 1, including the white inkjet ink and/or the colourless inkjet ink.

9. The inkjet ink set according to claim 1, wherein a pigment concentration in each of the inkjet inks A and B is less than 1.0 wt % based on a total weight of the respective inkjet ink.

10. The inkjet ink set according to claim 1, wherein each of the black inkjet ink, the cyan inkjet ink, the two inkjet inks (A) and (B), and the optional white inkjet ink and/or colourless inkjet ink is a radiation curable ink.

11. An inkjet printed colour pattern comprising:
 a substrate; and
 the inkjet ink set as defined in claim 1 printed on the substrate.

12. A decorative panel comprising:
 a substrate; and
 the inkjet printed colour pattern according to claim 11 printed on the substrate; wherein
 the decorative panel is one of flooring, a kitchen panel, furniture, and a wall panel.

13. A method of inkjet printing including the step of:
 inkjet printing a colour pattern on a substrate with the black inkjet ink, the cyan inkjet ink, and the two inkjet inks A and B of the inkjet ink set as defined in claim 1.

14. A method of manufacturing a decorative panel comprising:
 inkjet printing a colour pattern on a substrate with the black inkjet ink, the cyan inkjet ink, and the two inkjet inks A and B of the inkjet ink set as defined in claim 1.

* * * * *